June 10, 1930.　　O. WITTEL　　1,762,939
FILM MOVING MECHANISM
Filed June 10, 1925
FIG_1_
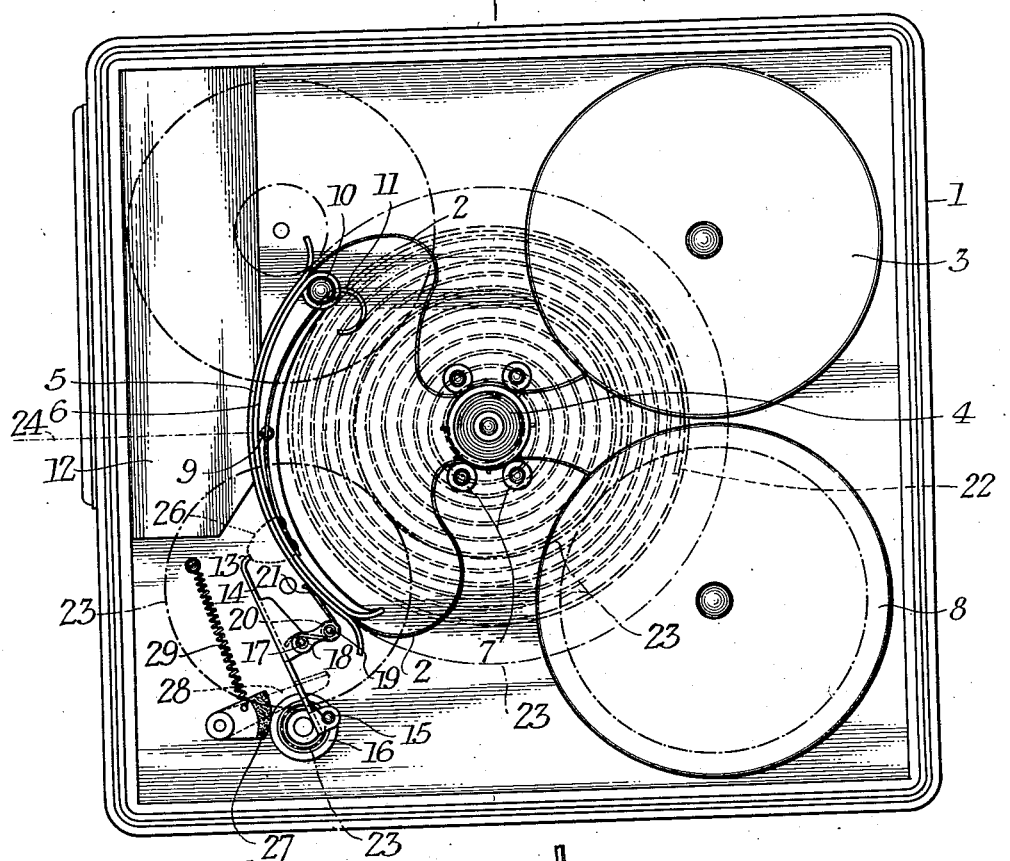
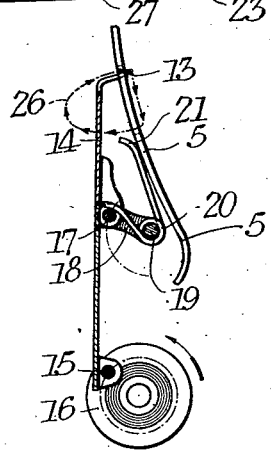
FIG_2_
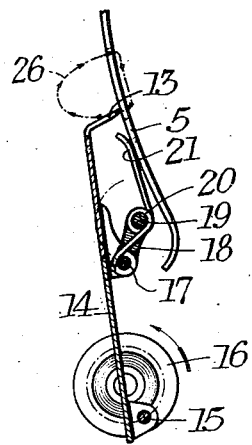
FIG_3_
Otto Wittel,
INVENTOR,
BY
ATTORNEYS.

Patented June 10, 1930

1,762,939

UNITED STATES PATENT OFFICE

OTTO WITTEL, OF ROCHESTER, NEW YORK, ASSIGNOR TO EASTMAN KODAK COMPANY, OF ROCHESTER, NEW YORK, A CORPORATION OF NEW YORK

FILM-MOVING MECHANISM

Application filed June 10, 1925. Serial No. 36,291.

This invention relates to motor driven motion picture apparatus and more particularly to means for equalizing the load on the motor.

In such apparatus it is usual to advance the film intermittently, and this causes a slight but perceptible variation in the load on the motor, due to the difference in the force required to move the mechanism only, and the mechanism and the film. In some types of camera, a part of the mechanism is also idle when the film is not moving causing a still greater variation in the load. While my invention is applicable to such a camera, I have shown it applied to one in which the mechanical parts move continuously and the variation in load is due to the film.

The principal object of my invention is to equalize this load and I attain this object by using at some point in the mechanism a spring which is capable of exerting a force about half as great as the variation in force, and which tends to move the mechanism to advance the film. This spring is tensioned by the mechanism when the film is not being moved, and this requires a force substantially equal to that exerted by the spring during the movement of the film. It follows that the load on the motor consists of a first substantially uniform component required to keep the mechanism as a whole in motion, and a second smaller component exerted either to tension the small spring or, assisted by the small spring, to move the film.

Reference will now be made to the accompanying drawing in all of the figures of which the same reference characters designate the same parts:

Fig. 1 is a side view of an open camera embodying my invention.

Figs. 2 and 3 show the pulldown mechanism at different points of its stroke.

My invention is shown as incorporated in a motion picture camera having a casing 1 one side of which is removable and is not here shown, thus affording access to the interior of the camera. The film 2 is drawn from a supply reel 3, over a sprocket 4 through a gate comprising curved members 5 and 6, back over the sprocket 4, against which it is held by rollers 7, to take up reel 8. The gate member 6 is held in place by lugs 9 and 10, the spring 11 having a latching engagement with the latter. The compartment 12 contains the usual shutter, objective and finder.

The film is advanced through the gate by claw 13 carried on the end of arm 14 pivoted by pin 15 to the rotating disc 16, and pivoted at 17 to a link 18 which is pivoted by pin 19 to the framework of the camera. A light spring 20 is coiled around pin 19 and one end 21 thereof extends against the gate member 5, while the other end bears against pivot pin 17, which it tends to move to the position shown in Fig. 3.

The mechanism is driven from a spring motor 22 by gear train 23, the members of which are indicated by dot-dash circles. The optical axis of the camera is indicated at 24 and the path of the claw at 26.

The combined starter and brake 27 bears against disc 16 and is operated by handle 28. It is normally drawn upwardly by spring 29.

The spring 20 is of insufficient strength to move the mechanism and adds to the force of the main motor only about half the power necessary to move the film past the gate. As the arm 14 moves to the position shown in Fig. 2, it tensions the spring and as it moves back the spring adds a slight force to that of the motor.

In any mechanical structure of this type there is unavoidably present a certain amount of back lash, lost motion, or play. As a result there is a certain amount of unsteadiness due to slight variations in the stroke of the claw. The film will not invariably stop at precisely the same point.

The presence of a spring such as 20, however, has, necessarily, the effect of putting a constant pressure on the parts insuring their moving on each stroke to one limit of their possible path, and taking up any lost motion and insuring the stopping of the claw and the film moved thereby at precisely the same spot.

It is to be understood that the disclosure herein is by way of example and that my invention is applicable to other types of motion picture apparatus, and to other types of energy storing instrumentalities. Such an instrumentality must have the power of transforming kinetic energy applied thereto into static energy which it is capable of retransforming into static energy. This property is best exemplified by elasticity, which is the property of a physical body, when displaced, distorted or compressed of tending to resume its original positon, shape or volume. I contemplate as within my invention all such modifications and equivalents as fall within the scope of the appended claim.

Having thus described my invention, what I claim as new and desire to secure by Letters Patent is:

In a motion picture apparatus having a frame and a motor carried thereby, mechanism driven by said motor and including an arm with a claw, a link pivoted to said arm and to said frame, and means to reciprocate said arm, whereby the claw is moved through a closed path, members forming a guideway for a film strip, a portion of said path intersection said guideway whereby the claw may engage and move a film, and a spring between the frame and the link and adapted to oppose and be tensioned by the movement of the link when the claw is being moved along its path outside of said guideway, and adapted to assist in the movement of the link and the mechanism connected thereto, when the claw is in the film engaging portion of its path, the force exerted by the spring alone being insufficient to move the film.

Signed at Rochester, New York, this 6th day of June, 1925.

OTTO WITTEL.